US 6,588,226 B1

(12) United States Patent
Semrow et al.

(10) Patent No.: US 6,588,226 B1
(45) Date of Patent: Jul. 8, 2003

(54) WATER RECOVERY AND DISPENSING SYSTEMS AND METHODS FOR USING THE SAME

(75) Inventors: Terry L. Semrow, Roy, UT (US); Elwin Brooks Petersen, Ogden, UT (US); Cory Buckway, Ogden, UT (US); Keith C. Warner, Clearfield, UT (US); Mark H. Nelson, Ogden, UT (US); Desiree Ragan, Kaysville, UT (US); Nick Wells, Layton, UT (US); Greg A. Cameron, Ogden, UT (US)

(73) Assignee: Aquatronics, Inc., Ogden, UT (US)

( * ) Notice: Subject to any disclaimer, the term of this patent is extended or adjusted under 35 U.S.C. 154(b) by 0 days.

(21) Appl. No.: 09/611,028

(22) Filed: Jul. 6, 2000

(51) Int. Cl.[7] .............................................. F25D 21/14
(52) U.S. Cl. ............................. 62/291; 62/318; 62/93; 62/285; 62/390; 62/151; 62/153
(58) Field of Search ................... 62/318, 93, 291, 62/285, 390, 3.2, 151, 153

(56) References Cited

U.S. PATENT DOCUMENTS

| 3,675,442 | A | | 7/1972 | Swanson | |
|---|---|---|---|---|---|
| 4,148,617 | A | * | 4/1979 | Clark | 55/267 |
| 4,182,132 | A | * | 1/1980 | Nasser et al. | 62/93 |
| 4,204,956 | A | | 5/1980 | Flatow | |
| 4,272,968 | A | * | 6/1981 | Harvill | 62/394 |
| 4,370,864 | A | * | 2/1983 | Wessa | 62/98 |
| 4,781,309 | A | * | 11/1988 | Vogel | 222/129.1 |
| 5,106,512 | A | | 4/1992 | Reidy | |
| 5,119,640 | A | * | 6/1992 | Conrad | 62/272 |
| 5,149,446 | A | | 9/1992 | Reidy | |
| 5,226,296 | A | * | 7/1993 | Kolvites et al. | 62/390 |
| 5,227,053 | A | | 7/1993 | Brym | |
| 5,259,203 | A | | 11/1993 | Engel et al. | |
| 5,301,516 | A | | 4/1994 | Poindexter | |
| 5,517,829 | A | | 5/1996 | Michael | |
| 5,535,600 | A | * | 7/1996 | Mills | 62/390 |
| 5,553,459 | A | | 9/1996 | Harrison | |
| 5,669,221 | A | | 9/1997 | LeBleu et al. | |
| 5,694,787 | A | * | 12/1997 | Cleleand et al. | 62/396 |
| 5,743,602 | A | * | 4/1998 | Maddux et al. | 312/140.1 |
| 5,845,504 | A | | 12/1998 | LeBleu | |
| 6,058,718 | A | * | 5/2000 | Forsberg et al. | 62/125 |
| 6,182,453 | B1 | * | 2/2001 | Forsberg | 62/125 |

* cited by examiner

Primary Examiner—William C. Doerrler
Assistant Examiner—Mark Shulman
(74) Attorney, Agent, or Firm—Parsons Behle & Latimer; James L. Sonntag

(57) ABSTRACT

A system for recovering potable water from the water vapor in ambient air at a wide range of temperature and humidity conditions. The system is especially adapt at operating efficiently at low temperatures and/or low humidities. The system is able to operate efficiently at low temperatures and/or low humidities by employing a mechanism for enhancing the buildup of frozen water on the surfaces used to condense the water vapor from ambient air.

16 Claims, 3 Drawing Sheets

WATER RECOVERY AND DISPENSING SYSTEMS AND METHODS FOR USING THE SAME

FIELD OF THE INVENTION

This invention relates generally to the creation of potable water from ambient air. More particularly, the invention relates to an apparatus and method for extracting potable drinking water from moisture-laden atmospheric air at atmospheric temperature.

BACKGROUND OF THE INVENTION

Potable water is a scarce or non-existent resource in many areas of the globe. Indeed, as the global population increases, the need for greater amounts of potable water will correspondingly increase.

The lack of potable water is a serious health concern. While the situation is bad in parts of the United States, it is worse in many other countries. There have been numerous instances where people have died or become ill because of water contamination and water-borne diseases. While "bottled water" is often thought as uncontaminated, there is an increasing awareness it may be no safer than municipally treated water.

Some people feel protected by household-type water filters. However, only a few of the many types of filters now being sold to the public for additional treating of city water remove significant amounts of parasites, viruses, bacteria, pesticides, heavy metals, and other contaminants.

There have been many techniques proposed to provide potable water for drinking and similar purposes. See, for example, U.S. Pat. Nos. 3,675,442, 4,204,956, 5,106,512, 5,149,446, 5,227,053, 5,259,203, 5,301,516, 5,517,829, 5,553,459, 5,669,221, and 5,845,504, (including documents cited therein), the disclosures of which are incorporated herein by reference. Many of such techniques, however, proved to be very expensive or inefficient, especially to recover water from ambient air at low temperatures and/or low humidities.

SUMMARY OF THE INVENTION

The present invention provides a system for recovering potable water from the water vapor in ambient air at a wide range of temperature and humidity conditions. The system is especially adapt at operating efficiently at low temperatures and/or low humidities. The system is able to operate efficiently at low temperatures and/or low humidities by employing a mechanism that utilizes the buildup of frozen water on the surfaces used to condense the water vapor from ambient air.

The present invention includes a water collection apparatus having a housing with at least one inlet and at least one outlet, means for flowing air into the housing through the at least one inlet and flowing air out of the housing through the at least one outlet, means for cooling the ambient air to condense the water vapor contained therein, means for collecting and means for storing the condensed water, means for purifying the condensed water, and means for increasing the amount of water vapor condensed from the ambient air at a low temperature or a low humidity. The at least one inlet may be an air filter and the air flowing means may be a fan. The cooling means may be at least one compressor, at least one evaporator coil, and at least one condenser coil all being in fluid communication via a refrigerant fluid. The purifying means may be a first means, such as at least one carbon filter, for removing particulate contaminants and second means, such as an ultraviolet light assembly, for removing biological contaminants. The means for increasing the amount of water vapor condensed enhances the build-up of frozen water on the at least one evaporator coil by regulating the operation of the at least one compressor by using, for example, a timer which cycles the frequency and interval of operation of the at least one compressor. The at least one compressor may be located proximate the ambient air which has been cooled by the cooling means.

The present invention also includes a method of using a water collection apparatus by providing a housing having at least one inlet and at least one outlet, providing means for flowing air into the housing through the at least one inlet and flowing air out of the housing through the at least one outlet, providing means for cooling the ambient air to condense the water vapor contained therein, providing means for collecting and means for storing the condensed water, providing means for purifying the condensed water, providing means for increasing the amount of water vapor condensed from the ambient air at a low temperature or a low humidity, and operating the apparatus to condense water vapor from ambient air.

The present invention also includes a method for collecting water from ambient air by providing a source of ambient air, condensing water vapor in the ambient air by cooling said air, collecting and storing the condensed water, purifying the condensed water, and increasing the build-up of frozen condensed water occurring when the ambient air is at a low temperature, a low humidity, or both. The ambient air can be cooled by contact with a surface maintained at a temperature lower than the ambient air, such as a part of at least one evaporator coil containing a refrigerant fluid. The at least one evaporator coil can be in fluid communication with at least one compressor and at least one condenser coil. The build-up of frozen water on the at least one evaporator coil can be increased by regulating the operation of the compressor via cycling the compressor on and off for a desired frequency and interval. The cooled ambient air can be contacted with the compressor.

DETAILED DESCRIPTION OF THE INVENTION

The following description provides specific details in order to provide a thorough understanding of the present invention. The skilled artisan, however, will understand that the present invention can be practiced without employing these specific details. Indeed, the present invention can be practiced by modifying the illustrated system and method, and the present invention can be used in conjunction with apparatus and techniques conventionally used in the industry.

Figure 1:
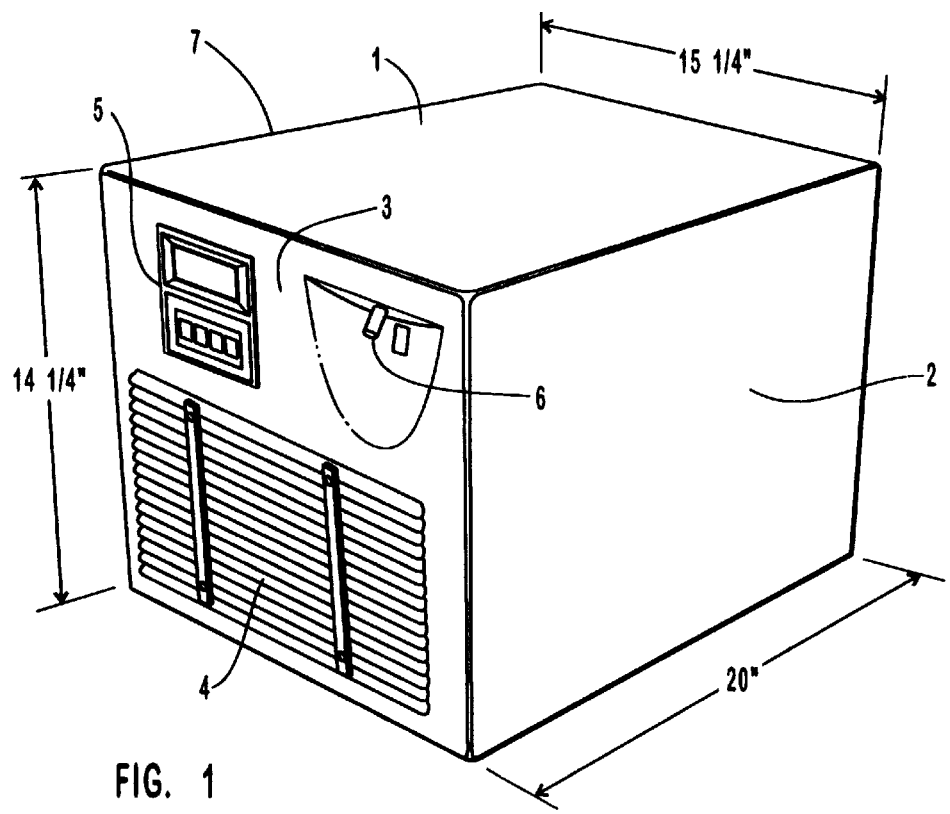
FIG. 1 is a perspective view of an embodiment of the invention.
Figure 2:
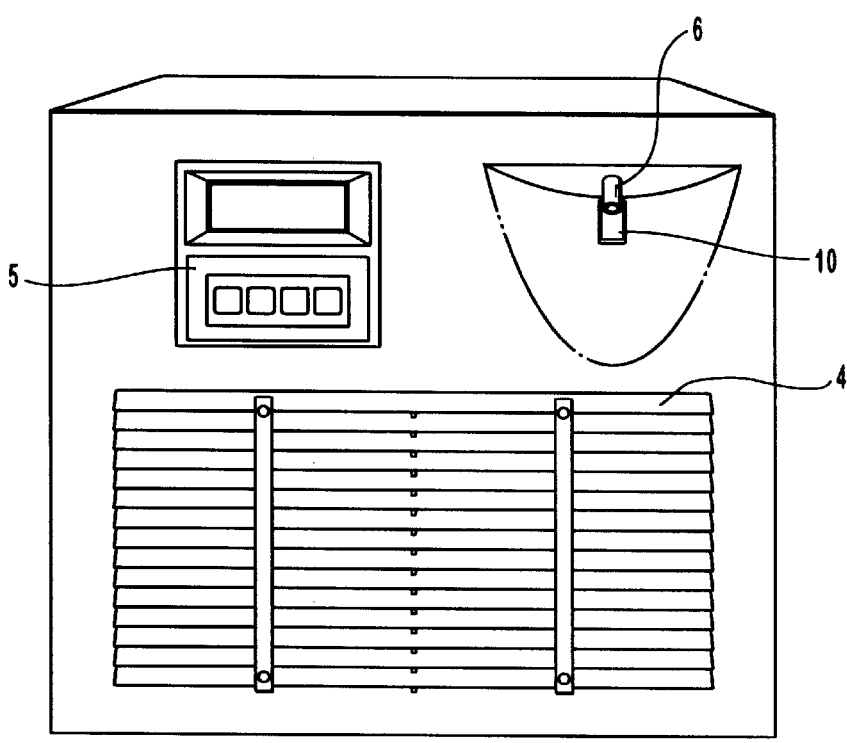
FIG. 2 is a front view of the embodiment of FIG. 1.

FIGS. 1 and 2 illustrate one water recovery and/or dispensing system according to the present invention. Other water recovery and dispensing systems are not illustrated, but can be envisioned by modifying the system illustrated in FIG. 1. For example, the water recovery and dispensing system in FIG. 1 has a capacity for producing about 1–24 gallons in 24 hours. Larger (or smaller) capacity systems can be designed by scaling the system in FIG. 1 to a larger (or smaller) capacity.

In FIG. 1, the water recovery and dispensing system ("WRDS") comprises a housing 7 for enclosing, as described below, the various components and elements of the WRDS. Housing 7 can be of any suitable shape and configuration sufficient to house such components and elements. The depth, width, and height of housing 7 can vary depending on the size necessary to enclose such components and elements. In one aspect of the invention, the depth of housing 7 is about 20 inches, the width of housing 7 is about 15 inches, and the height of housing 7 is about 14 inches.

In one preferable configuration of the WRDS, housing 7 has a substantially cubical configuration with sides 2, top 1, back 8, and front 3, all having a substantially cubical configuration. In one aspect of the invention, the sides, top, back, and front of housing 7 can be separate panels which are connected together to form housing 7. For example, the sides 2 and top 1 can be made as a unitary piece can be provided with flanges on the front and back. Front 3 and back 8 can be made as separate panels which are then removably connected to the flanges of the unitary sides/top piece in any suitable manner. Bottom 16 can be a separate panel with an upwardly-extending flange which is used to removably connect bottom 8 to the unitary sides/top piece, the front panel, and/or the back panel in any suitable manner.

Preferably, as many of the sides, top, back, and front of housing 7 are formed of a unitary piece of material, thus simplifying construction of housing 7. Thus, housing 7 has the following preferred construction. Sides 2, top 1, front 3, and back 8 are made of a single, unitary piece of material which has been molded or bent into the desired shape as shown in FIG. 1. This unitary piece can be lowered over the unit and fastened to bottom 16. Any removable connection known in the art can be used for these connections.

The various components comprising housing 7 can be made of any suitable material. Suitable materials include composite plastic, fiberglass, and stainless steel. The various front, back, sides, top, and bottom can be made of the same or different materials. Preferably, the front, back, sides, top, and bottom of housing 7 are all made of composite plastic.

Figure 3:
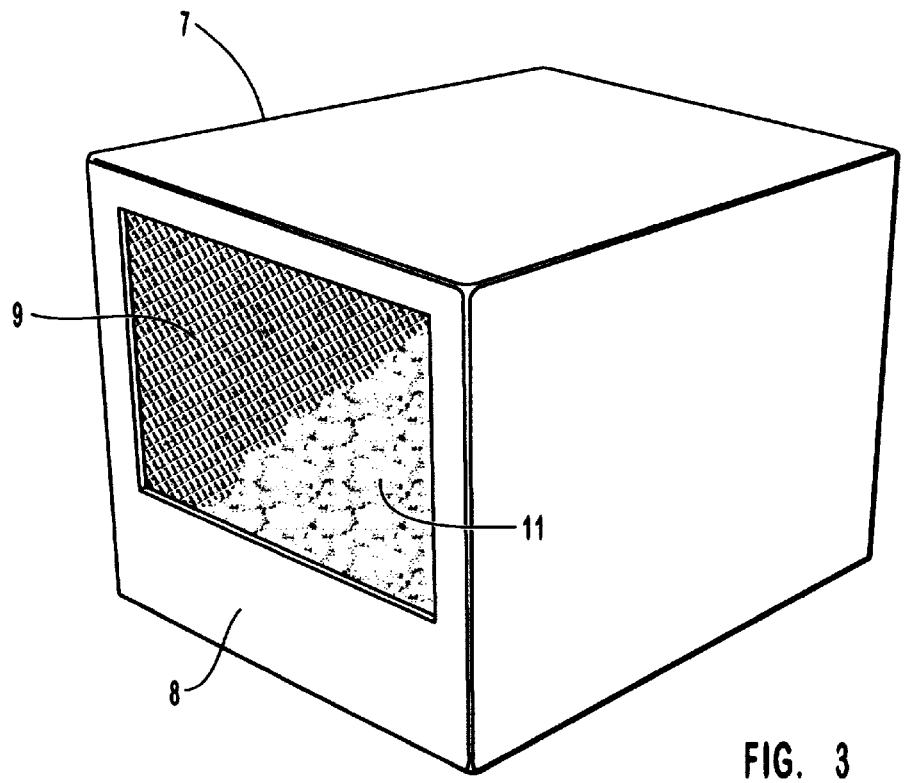
FIG. 3 is a perspective view as in FIG. 1 showing the back.

As shown in FIG. 3, back 8 of housing 7 is provided with at least one inlet 9 for ambient air to enter the housing 7. At least one inlet 9 can be of any shape or configuration depending the desired amount and characteristics of the entering air flow, the ease of construction, and as described below, the size of the air filter placed therein. The at least one air inlet 9 may comprise several openings for several air inlets. Preferably, when back 8 has a size of 15×15 inches, the at least one air inlet 9 is a single, rectangular opening in the panel of back 8 with a size of about 13×9 inches.

Front 3 of housing 7 is provided with at least one outlet 4 for the air flow to exit housing 7. At least one outlet 4 can be of any shape or configuration depending the desired amount and characteristics of the exiting air flow, the ease of construction, and as described below, the size of the optional air filter placed therein. The at least one air outlet 4 may comprise several openings for several air outlets with differing sizes and shapes. Preferably, as illustrated in FIG. 1, the at least one air outlet 4 is a series of lateral slats for the exiting air flow. Optionally, the at least one outlet 4 can be provided with an appropriate air filter as known in the art. See, for example, U.S. Pat. Nos. 5,669,221 and 5,845,504, the disclosures of which are incorporated herein by reference.

Front 3 of housing 7 can be provided with other openings. A first opening can be provided for manual dispensing control means, such as dispenser switch 10. A second opening can be provided for dispensing means, such as dispenser or faucet 6. Other openings can be provided in front 3 for many similar purposes, such as message center 5. For example, openings can be provided for optional thermostat and humidistat switches and gauges as known in the art. See, for example, U.S. Pat. Nos. 5,106,512 and 5,149,446, the disclosures of which are incorporated herein by reference.

The WRDS of the preset invention includes means for flowing air into housing 7 through the at least one inlet 9 and out of housing 7 via the at least one outlet 4. In one aspect of the invention, such air flowing means includes a fan or blower 14 which assists in bringing ambient air into housing 7. Any suitable fan or blower known in the art can be used as the air flowing means in the present invention. See, for example, U.S. Pat. No. 5,259,203, the disclosure of which is incorporated herein by reference.

In entering through the at least one inlet 9, the ambient air first passes through air cleaning means, such as air filter 11. Any suitable air filter which removes contaminants, including particulates, from the ambient air can be used in the present invention. See, for example, U.S. Pat. Nos. 5,669,221 and 5,845,504, the disclosures of which are incorporated herein by reference. Preferably, an electrostatic air filter is used as the air cleaning means in the present invention. The ambient air exits housing 7 via the at least one outlet 4. For the at least one outlet 4 illustrated in FIG. 1, the air exits through the slats in front 3. For the at least one outlet 4 which incorporates an optional air filter, the air exits through that air filter.

The ambient air flowing through the WRDS of the present invention flows over cooling means. The cooling means and air flow are configured for maximum contact between the air and the cooling means. The cooling means lowers the temperature of the ambient air, thereby condensing a portion of the water vapor present in that air. The cooling means of the present invention can be any cooling mechanism or cooling apparatus known in the art, such as dehumidifiers. See, for example, U.S. Pat. Nos. 5,259,503, 5,669,221, and 5,845,504, the disclosures of which are incorporated herein by reference.

Figure 4:
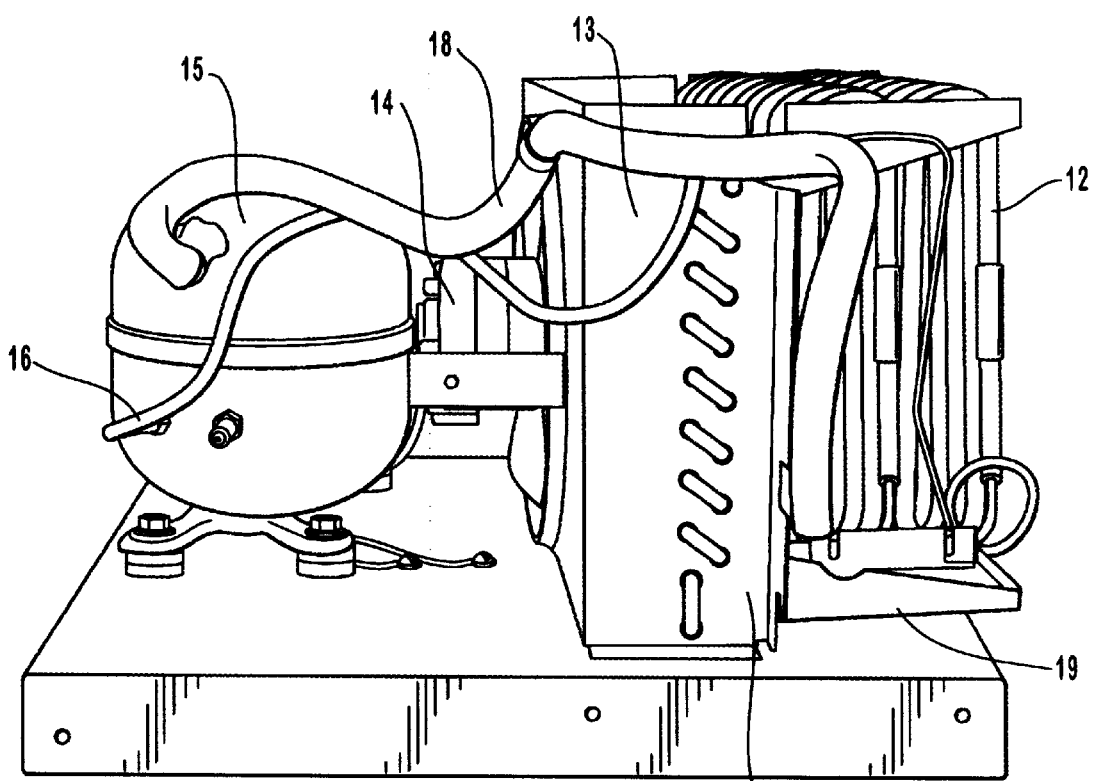
FIG. 4 is side view of an embodiment of the cooling means of the invention.

Preferably, the cooling means depicted in FIG. 4 is employed in the present invention. This cooling means comprises compressing means, such as a compressor 15, at least one evaporator coil 12, and at least one condenser coil 13. The outlet of the at least evaporator coil 12 is connected by a conduit 18 to the inlet of the compressor 15. The at least one condenser coil 13 is provided having an inlet and an outlet, with the inlet connected to the outlet of the compressor 15 by a conduit 16. The outlet of the at least one condenser 13 is connected to the inlet of the at least one evaporator coil 12 by a conduit 17.

In operation, a refrigerant fluid, such as freon, is cycled through the various conduits and the at least one evaporator coil 12 and the at least one condenser coil 13 by the compressor 15. As the refrigerant is compressed to near a state of adiabatic compression by the compressor, its temperature rises due to the work (energy) added to the refrigerant fluid. The heated and pressurized refrigerant vapor is then contained and distributed to the condenser coil. As the heat is drawn away from the refrigerant vapor by the condenser coil, the temperature of the refrigerant vapor is lowered and it is condensed into a high pressure liquid. The high pressure liquid is then distributed to the inlet of the evaporator coil 12.

The high pressure liquid then moves into the evaporator coil 12, which is at a state of vacuum or low pressure caused by the compressor. This causes the contained high pressure liquid to boil or evaporate, thereby absorbing heat from the ambient air. The temperature of the outer surface of the evaporator coil is maintained at about 29° to about 34° degrees Fahrenheit. The high pressure liquid refrigerant is then transformed into a low pressure refrigerant liquid and further into a low pressure refrigerant vapor. The low pressure refrigerant vapor is then drawn through the outlet of evaporator coil 12 and into the compressor 15 where it is once again compressed by compressor 15.

The at least one evaporator coil 12 used in the present invention advantageously produces a large amount of water with little refrigerant leak. Some of the prior art cooling means (i.e., dehumidifiers) were of a radiator type unit which produced little water and created a potential safety hazard because of the presence of numerous soldered joints presented a potential refrigerant leak. By using the at least one evaporator coil depicted in FIG. 4, which has a single wound coil, the number of soldered joints is decreased and the amount of water produced is increased because of the increased available surface area for condensation.

The at least one condenser coil 13 of the present invention is connected to suitable compressing means (i.e., compressor 15) which compress the refrigerant fluid after it has circulated through the evaporator coils. Suitable compressing means, therefore, include any apparatus or device capable of compressing the refrigerant fluid used in the present invention, such as any of the various compressors known in the art. See, for example, U.S. Pat. Nos. 5,259,503, 5,301,516, and 5,845,504, the disclosures of which are incorporated herein by reference.

One of the problems with the cooling means known in the art is the excess heat generated by such means when cooling the ambient air. The excess heat damaged the cooling means, causing inconsistent operation and results. To alleviate this problem, the excess heat generated in the cooling process is removed in the present invention. In one aspect of the invention, this excess heat is removed by disassembling and repositioning the cooling means of the present invention within housing 7. As the compressing means typically generates the excess heat, it was placed within housing 7 so that the cooled ambient air flows across the compressing means prior to exiting housing 7. Thus, the compressing means (and consequently the entire cooling process) runs cooler and more consistent.

The water vapor condensing from the ambient air on the at least one evaporator coil 12 is collected by collection means and stored in storage means. Any suitable collection means known in the art can be employed in the present invention. See, for example, U.S. Pat. Nos. 5,106,512 and 5,845,504, the disclosures of which are incorporated herein by reference. In one aspect of the invention, the water condensate falls off the evaporator coils by the force of gravity and into collection container 19 underlying the cooling means. The collection container 19 should have a size and shape sufficient to catch and collect the condensated water from the cooling means.

The collection means has any suitable configuration which feeds water by gravity flow into the storage means. Preferably, the collection container 19 has an inclined bottom such that the condensated water flows into a drain aperture at the lower portion of container 19. The aperture in the inclined bottom serves to funnel the collected water from the collection means into the storage means. If desired, a water filter as known in the art can be placed between the cooling means and the storage means, e.g., just below the aperture.

Figure 5:
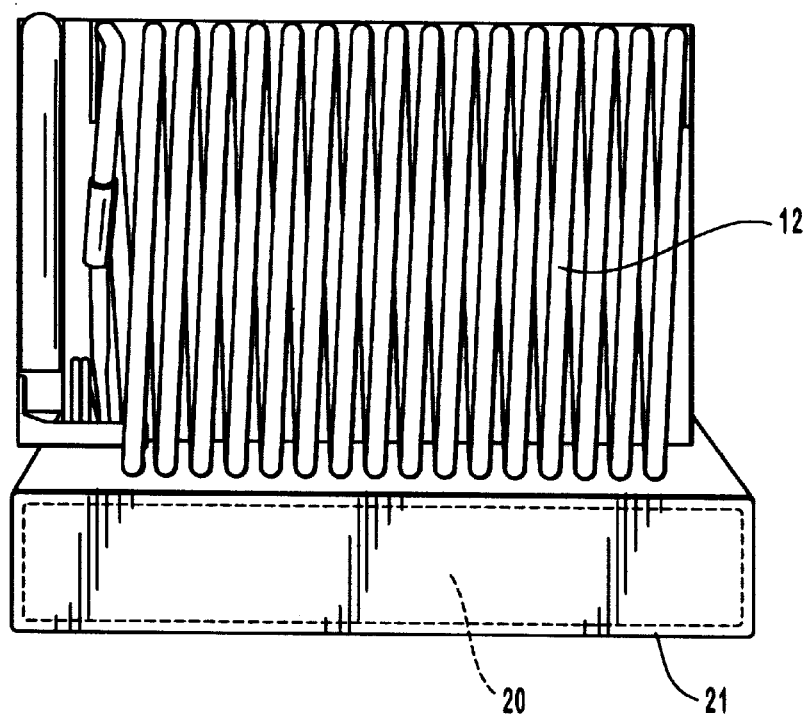
FIG. 5 is a view as in FIG. 4 from the rear.

Storage means employed in the present invention can be any container or storage mechanism known in the art. Preferably, as depicted in FIG. 5, a storage reservoir 20 is used as the storage means. Reservoir 20 is made of any material which exhibits the necessary structural strength without contaminating the stored water, such as stainless steel or food-grade composite plastic. Reservoir 20 should be large enough to have sufficient capacity to store the desired amount of condensed water yet be small enough to fit within the space available in housing 7. The capacity of the storage means depends on the size of housing 7 and the size of the WRDS of the present invention. Generally, the capacity can range from about 2 to about 4 gallons, and preferably is about 3 gallons.

The storage means can be provided with any suitable sensor and accompanying shut-off device as known in the art to control the level of the water in the storage means and prevent overflow. See, for example, U.S. Pat. Nos. 5,149,446 and 5,301,516, the disclosures of which are incorporated herein by reference. Preferably, the present invention uses an electronic level probe to shut off the compressor when the reservoir is full.

The storage means can also be provided with a secondary or back-up reservoir, either internal or external the housing 7. As known in the art, excess water can be pumped from reservoir 20 to the a secondary or back-up reservoir (not illustrated) when needed. See, for example, U.S. Pat. Nos. 5,149,446, the disclosure of which is incorporated herein by reference.

The condensed water in the storage means is usually not potable, i.e., it is not suitable for drinking and other sanitary uses. Thus, the condensed water must be purified and/or cleaned prior to being dispensed. Any suitable purification means known in the art can be employed in the present invention to clean the water. See, for example, U.S. Pat. Nos. 4,204,956, 5,227,053, 5,669,221, and 5,845,504, the disclosures of which are incorporated herein by reference.

Figure 6:
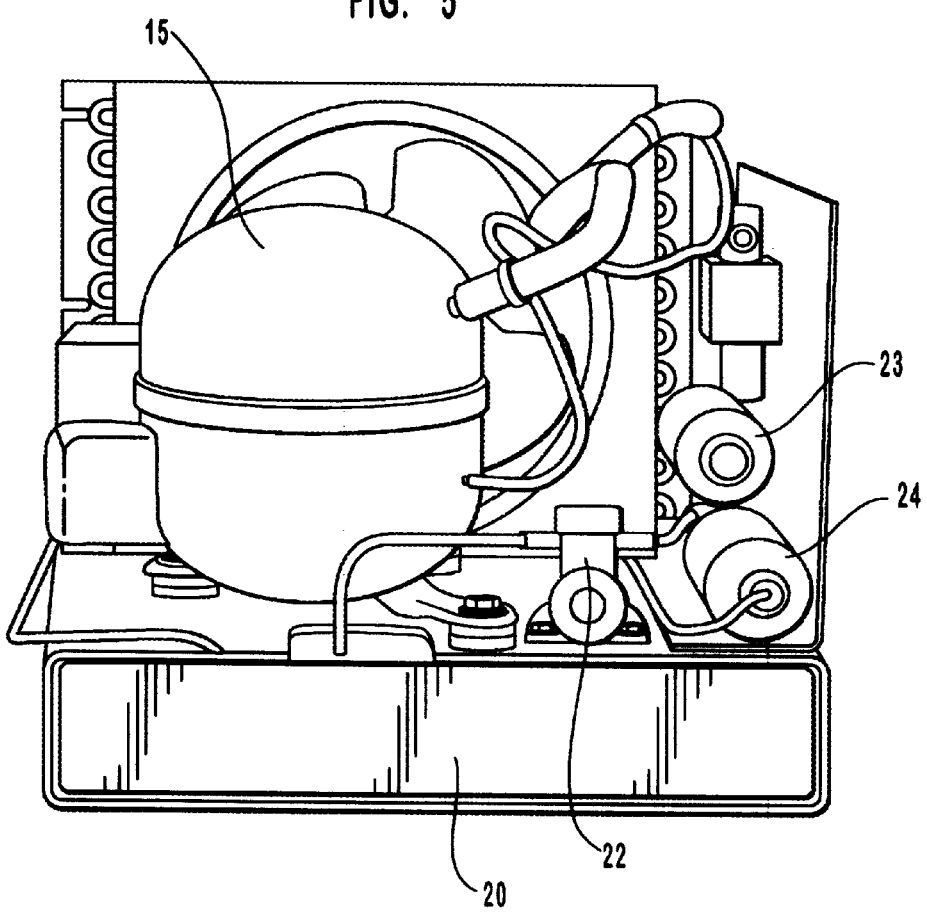
FIG. 6 is a view as in FIG. 4 from the front.

In one aspect of the present invention, as shown in FIG. 6, after exiting the storage means via pump 22, the condensed water is purified by a dual-stage purification system. The first stage comprises at least one filter 23 and the second stage comprises an ultraviolet (uv) assembly 24. In the first stage, particulate contaminants are primarily removed from the water. In the second stage, biological contaminants are primarily removed from the water.

In the first stage, the water passes (or is pumped) over the at least one filter 23. When passing through the at least one filter 23, particulate contaminants are removed from the water via a filtering mechanism. The at least one filter 23 can be several separate types of filters in series or can be a single filter with layers of different types of filters. See, for example, U.S. Pat. No. 5,517,829, the disclosure of which is incorporated herein by reference. Preferably, the at least one filter is a single device with layers of different types of filters, e.g., sand filter, sediment filter, and a carbon filter all contained within a single housing. More preferably, the at least one filter is a Hydro-Flow carbon filter.

In the second stage, the water is further purified to remove biological contaminants. As known in the art, exposing water to select wavelengths of ultraviolet radiation will effectively kill harmful biological-based contaminants. See, for example, U.S. Pat. Nos. 4,204,956, 5,227,053, and 5,669,221, the disclosures of which are incorporated herein by reference. In the present invention, the uv assembly 24 comprises a substantially cylindrical housing with transparent tubing running lengthwise through the housing. The water is pumped through the transparent tubing where it is irradiated with ultraviolet light. If desired, the water can be recycled one or more times through the first and/or the second stage to increase the purity of the water. The water is preferably recycled more than once when the residence time of the water in the uv assembly is short.

After the dual-stage purification process, the water can be manually or automatically dispensed. The water is manually dispensed on an on-demand basis when a user activates the switch 10 located on the front of the WRDS of the present invention. When switch 10 is activated, the water is pumped from reservoir 20 through the dual-stage purification system at least once, and then out faucet 6. The water can be automatically dispensed to the secondary reservoir using a solenoid valve and overflow switch as shown in the art.

At low temperatures and/or low humidities, the efficiency of the water recovery from the ambient air can be decreased. At low temperatures (i.e., less than about 70 degrees Fahrenheit) and/or low humidities (i.e., less than about 50%), the condensed water vapor on the evaporator coil of the cooling means exhibits a tendency to freeze and build-up, thus halting water production. To reduce or prevent this inefficiency in the water production, the present invention contains means for increasing the amount of water vapor condensed from the ambient air at a low temperature and/or a low humidity. Such means include any apparatus which enhances the tendency of the condensed water to build-up on evaporator coils when freezing under these conditions.

Preferably, at low temperatures and/or low humidities, the system of the present invention is designed to allow frost to build up on the at least one evaporator coil. As frost builds up, it increases the surface area on which the water vapor in the air condenses, thereby increasing the amount of water (frost). The system of the present invention therefore allows the frost to build up for any desired amount of time, e.g., for about 2 hours. After this time period, a timer connected to the compressor of the cooling means regulates operation of the compressor by cycling the compressor on and off for any desired frequency and interval. Preferably, the timer shuts off the compressor for about 10 minutes. During this time the fan continues to operate, pulling ambient air across the frozen water, accelerating the defrosting process and decreasing the amount of time the compressor is shut off.

The frequency and interval for cycling the compressor on and off can depend on the temperature and humidity of the ambient air. In one aspect of the present invention, the cooling means of the present invention is allowed to condense the water vapor by cooling ambient air at about 65° degrees Fahrenheit and about 50% humidity for about 2 hours, during which time a layer of frost of about ¼ inches builds up on the evaporator coils. The compressor attached to the condenser coils is then shut off for about 10 minutes, allowing this thin layer of frost to melt. The compressor is then turned back on and operation of the cooling means continues.

The present invention also employs, as much as possible, suitable materials in the elements and components of the WRDS which inhibit or reduce bacteria growth. It was noticed that after prolonged inactivity, the elements and components of the WRDS not containing such materials began to have an increased bacteria growth. By using suitable materials, this bacteria growth is reduced or eliminated. Suitable materials which inhibit or reduce the bacteria growth include FDA approved food-grade composite plastic materials and NSF approved pumps and hoses.

The WRDS of the present invention is preferably—but not necessarily—stationary and therefore not portable. Some of the devices known in the art were provided with wheels so the device would be portable and easily moved. See, for example, U.S. Pat. Nos. 5,669,221 and 5,845,504, the disclosures of which are incorporated herein by reference. This portability, however, caused excess movement of their devices and resulted in erratic functioning. Thus, the present invention is preferably stationary and not provided with wheels or the like for portability. Indeed, when the device of the present invention is placed a height above the floor (i.e., a counter-top), it is dangerous for the device to have wheels as movement of the device could cause it to fall over on the user.

Optional sensors and gauges can be included in the present invention to measure and maintain operation of the individual operating components within the desired parameters. Examples of such sensors and gauges (and their operation) are described in U.S. Pat. Nos. 5,301,516 and 5,669,221, the disclosures of which are incorporated herein by reference. For example, a temperature and/or pressure sensing valve can be used to control the low of refrigerant fluid among the various components of the cooling means. By controlling the refrigerant fluid flow, the operation of the WRDS of the present invention may be optimized to collect the maximum amount or purified potable water. Such a temperature and/or pressure sensing valve can be positioned, for example, between the condensing coil 13 and the evaporator coil 12.

In operation, the WRDS of the present invention can be placed within any suitable location, e.g., a home, business, or other indoor or outdoor location. In one aspect of the invention, the WRDS of the present can supply more than 24 gallons of water during 24 hours of use. The WRDS of the present invention, however, may be scaled up (or down) as described above to supply larger (or lesser) quantities of water.

The WRDS of the present invention is connected to suitable power supply, such as an electrical power supply. Other power supply means may be used in the present invention, such as solar power, gas, compressed air, hydrogen power, or the like. The WRDS is also provided with suitable control means, such as a manual or automatic electrical switch, that is actuated to begin operation of the device. When the control means is switched on, the airflow means draws air through the at least one inlet 9 and through the air filter 11. The ambient air then passes across the evaporator coil 12 and compressor 15, and finally exits through the at least one outlet 4.

As described above, the compressing means circulates refrigerant fluid through conduits 16, 17, and 18 where it passes first through the condenser coil 13 and then to the evaporator coil 12. The refrigerant fluid cools the surface of the evaporator coils through heat transfer, heating the refrigerant fluid and causing it to expand. This warmer refrigerant fluid is then passed back to the compressing means 15.

The evaporator coil 12 cools the ambient air flowing past their outer surface. When the ambient air is cooled, the water vapor contained in the ambient air condenses on the outer surface of the evaporator coil. The condensation forms water droplets, which fall by gravity from the outside of the evaporator coil and into the collection means. Alternatively, at a low temperature and pressure, the condensation forms a thin layer of frost which is then melted as described above, and the melted water falls into the collection means. The collected water flows along the inclined bottom portion of the collection container 19, through the drain aperture, which is in fluid communication with the inlet of reservoir 20. Preferably, the inlet of the reservoir 20 is positioned beneath the drain aperture of the collection container 19. Optionally, a water filter can be disposed between the drain aperture and the inlet of the reservoir 20 to remove any desired contaminants from the collected water prior to storage in reservoir 20.

The electronic level probe is used to shut off the compressing means when the liquid level in reservoir 20 has reached a desired level. Without the compressor operating, the ambient air is not cooled and no water vapor condenses. This eliminates the need to check the WRDS of the present invention repeatedly to avoid excess water which may overflow reservoir 20.

The evaporator coil 12 and the collection container 19 come in direct contact with the water droplets formed by condensation, and thus can be periodically cleaned to avoid contamination of the potable water. The coils and collection means can be cleaned by any suitable process known in the art, such as those described in U.S. Pat. No. 5,301,516, the disclosure of which is incorporated herein by reference.

The water is dispersed form the reservoir 20 via pump 22. A user presses switch 10, which is electrically connected to and turns on pump 22. Pump 22 then pumps the water from reservoir 20 at least once through the dual-stage purification system where contaminants, both particulate and biological, are removed. The purified water than exits the WRDS of the present invention through faucet 6.

Having described the preferred embodiments of the present invention, the invention defined by the appended claims is not to be limited by particular details set forth in the above description; many apparent variations thereof are possible without departing from the spirit or scope thereof.

We claim:

1. A method for extracting water from air at a wide range of temperature and humidity conditions, the method comprising;
    passing ambient air containing water vapor over a cooling surface, the cooling surface constructed and configured, and operated at a surface temperature that allows the water vapor to condense as liquid water or as frozen water depending upon ambient temperature and ambient humidity conditions, with frozen water forming as the ambient temperature or ambient humidity conditions approach low temperature or low humidity conditions;
    raising the cooling surface temperature to allow any water vapor condensed as frozen water on the cooling surface to melt to liquid water;
    collecting the liquid water from the cooling surface;
    purifying the collected water to render the water potable.

2. A method as in claim 1 wherein the cooling surface is provided by a refrigeration system comprising the cooling surface, a heat rejection surface, and an energy input, all in communication in the refrigeration system for transferring energy between the cooling surface and the heat rejection surface.

3. A method as in claim 2 wherein the cooling surface, the heat rejection surface, and the energy input of the refrigeration system are respectively an evaporator coil, a condenser coil, and a compressor, all in fluid communication.

4. A method as in claim 2 wherein the shutting off is in response a timed switching system where the energy input operates to achieve the condensation of the water vapor and the energy input shuts off to achieve the melting of the frozen water.

5. A method for extracting water from air at a wide range of temperature and humidity conditions, the method comprising;
    passing ambient air containing water vapor over a cooling surface, the cooling surface constructed and configured, and operated at a surface temperature that permits the water vapor to condense as liquid water or as frozen water depending upon ambient temperature and ambient humidity conditions, with frozen water forming as the ambient temperature or ambient humidity conditions approach low temperature or low humidity conditions,
    the cooling surface provided by a refrigeration system comprising the cooling surface, a heat rejection surface, and an energy input, the refrigeration system for transferring energy between the cooling surface and the heat rejection surface;
    raising the cooling surface temperature to allow any water vapor condensed as frozen water on the cooling surface to melt to liquid water;
    collecting the liquid water from the cooling surface;
    purifying the collected water to render the water potable;
    passing the cooled air that has passed over the cooling surface over the heat rejection surface or over the energy input to cool the heat rejection surface or energy input.

6. A method as in claim 5 wherein the cooling surface, the heat rejection surface, and the energy input of the refrigeration system are respectively an evaporator coil, a condenser coil, and a compressor, all in fluid communication.

7. A method as in claim 5 wherein the raising of the cooling surface temperature includes momentarily shutting off the energy input to cease the transfer of energy between the cooling surface and the heat rejection surface for sufficient time to raise the cooling surface temperature.

8. A method as in claim 7 wherein the shutting off is in response to timed switching system where the energy input operates to achieve the condensation of the water vapor and shuts off to achieve the melting of the frozen water.

9. A method as in claim 5 wherein the cooled air that has passed over the cooling surface is passed over both the heat rejection surface and the energy input to cool both the heat rejection surface and the energy input.

10. An apparatus for extracting water from air at a wide range of temperature and humidity conditions, the apparatus comprising;
    a cooling surface over which ambient air containing water vapor is passed, the cooling surface constructed and configured, and operated at a surface temperature that permits the water vapor to condense as liquid water or as frozen water depending upon ambient temperature and ambient humidity conditions, with frozen water forming as the ambient temperature or ambient humidity conditions approach low temperature or low humidity conditions;
    structure for raising the cooling surface temperature to allow any water vapor condensed as frozen water on the cooling surface to melt to liquid water;
    collector for collecting the liquid water from the cooling surface;

purifier for purifying the collected water to render the water potable.

11. An apparatus as in claim 10 wherein the cooling surface is provided by a refrigeration system comprising the cooling surface, a heat rejection surface, and an energy input, all in communication for transferring energy between the cooling surface and the heat rejection surface.

12. An apparatus as in claim 11 additionally comprising structure for directing the air after it has passed over the cooling surface and been cooled over the energy input or the heat rejection surface for cooling the energy input or the heat rejection surface.

13. An apparatus as in claim 11 wherein the cooling surface, the heat rejection surface, and the energy input of the refrigeration system are respectively an evaporator coil, a condenser coil, and a compressor, all in fluid communication.

14. An apparatus as in claim 11 additionally comprising a switch for momentarily shutting off the energy input to cease the transfer of energy between the cooling surface and the heat rejection surface for sufficient time to raise the cooling surface temperature.

15. An apparatus as in claim 11 additionally comprising a cycling system wherein the energy input is operated to achieve condensation of the water vapor on the cooling surface, and energy input is shut off to achieve the melting of the frozen water.

16. An apparatus for extracting water from air comprising:

cooling surface;

heat rejection surface;

energy input, the cooling surface, heat rejection surface and energy input in communication for transferring energy from the cooling surface to the heat rejection surface;

an air conveying system that conveys air first over the cooling surface where vapor from the air is condensed upon the cooling surface; and then over either or both the heat rejection surface and the energy input surface to remove heat therefrom;

a switching system for switching off the energy input to cease the transfer of energy from the cooling surface to allow the cooling surface to warm sufficient to allow frozen water on the surface to melt;

a collecting a purifying system to collect liquid water from the cooling surface and produce potable water;

the cooling surface constructed and configured, and operated at a surface temperature that permits the water vapor to condense as liquid water or as frozen water depending upon ambient temperature and ambient humidity conditions, with frozen water forming as the ambient temperature or ambient humidity conditions approach low temperature or low humidity conditions.

* * * * *